United States Patent [19]

Tanimoto et al.

[11] Patent Number: 4,592,543
[45] Date of Patent: Jun. 3, 1986

[54] ORIGINAL DOCUMENT AUTOMATIC FEEDING ARRANGEMENT FOR USE IN COPYING APPARATUS AND THE LIKE

[75] Inventors: Takuharu Tanimoto; Sounosuke Tsuda; Mutsuo Yamasaki, all of Fukuyama, Japan

[73] Assignee: Sharp Kabushiki Kaisha, Osaka, Japan

[21] Appl. No.: 629,487

[22] Filed: Jul. 10, 1984

[30] Foreign Application Priority Data

Jul. 20, 1983 [JP] Japan ................. 58-133081

[51] Int. Cl.⁴ .................. B65H 5/02; B65H 9/20
[52] U.S. Cl. .................... 271/227; 271/258; 271/275; 355/75; 355/68
[58] Field of Search ............ 271/227, 258, 259, 265, 271/266, 245, 246, 247, 110, 275, 4, 10; 355/75, 68, 3 SH, 14 SH

[56] References Cited

U.S. PATENT DOCUMENTS 3,799,537  3/1974  Cobb ........................ 271/3
4,179,215 12/1979  Hage ................... 355/14 SH
4,422,751 12/1983  Komiya et al. ........ 355/14 SH
4,455,018  6/1984  Colglazier et al. .......... 271/227
4,470,591  9/1984  Aquaviva ................... 271/245

Primary Examiner—Bruce H. Stoner, Jr.
Assistant Examiner—James E. Barlow
Attorney, Agent, or Firm—Birch, Stewart, Kolasch & Birch

[57] ABSTRACT

An improved original document automatic feeding arrangement for use in a copying apparatus and the like, which includes a sheet feeding section for feeding an original document therefrom, and a transport section provided on an original document placing platen and including a transport belt for transporting the original document so that the transport of the original document is suspended upon detection that a leading edge of the original document has passed through a predetermined position on the platen. The transport belt is composed of a light transmitting material, while a photo-electric sensor is provided at the predetermined position and has the transport belt and the platen as part of its light path.

5 Claims, 2 Drawing Figures

ORIGINAL DOCUMENT AUTOMATIC FEEDING ARRANGEMENT FOR USE IN COPYING APPARATUS AND THE LIKE

BACKGROUND OF THE INVENTION

The present invention generally relates to a feeding arrangement and more particularly, to an automatic feeding arrangement of original documents for use in a copying apparatus and the like, which is so arranged to transport an original document over an original document platform or platen (referred to as a platen hereinafter) on which the original document is placed for exposure, and to automatically stop the original document upon arrival thereof at a predetermined copying position, and also, to automatically discharge the original document simultaneously upon completion of the copying.

Generally, the automatic original document feeding arrangement for a copying apparatus includes a sheet feeding mechanism and a sheet transport mechanism, and in order to meet the recent increasing demand for automatically copying a large number of original documents, with a subsequent sorting or classification thereof, there have been conventionally proposed various original document feeding arrangements and sorters. Under the circumstances as described above, particular importance is attached to the function of automatically stopping the original documents being transported, correctly at a predetermined copying position.

For stopping the original documents at the predetermined position as described above, there have already been proposed several systems as follows.

(i) A system for mechanically stopping the original document being transported, by a stopper member.
(ii) A system in which the original document is once caused to pass through a predetermined position on an original document placing platen, and thereafter, returned to the predetermined position by moving an original document transport belt in a reverse direction.
(iii) A system in which, during insertion of an original document, the leading edge thereof is detected so as to be advanced up to a predetermined position by a timing monitor.
(iv) A system in which the leading edge of an original document is detected by a reflection type photo-electric sensor so as to be stopped at a predetermined position.

Each of these known systems, however, has an advantage or disadvantage inherent therein, and can not be regarded as perfect.

More specifically, in the system (i), in the case of a very thin original document, there is a possibility that the original document becomes wrinkled when mechanically stopped by the stopper member, and the system (ii) is rather inefficient since the original document transport belt functions in three stages of advance→retreat→advance, with a certain difficulty in design, while the system (iii) is not free from the drawback that an error in stopping at the predetermined position is increased, since a distance from the detecting position to the stopping position of the original document is too long. Further, in the system (iv), although the disadvantages as described in the foregoing may be eliminated, the detecting portion can not be covered by an original document transport belt, since the transport belt is not transparent and the leading edge of the original document is arranged to be detected through a light reflection system, and thus, there is a disadvantage such that the original document is transported, with a part thereof protruding from the transport belt.

SUMMARY OF THE INVENTION

Accordingly, an essential object of the present invention is to provide an automatic original document feeding arrangement for use in a copying apparatus and the like, which is capable of stopping any original document stably at a predetermined position, irrespective of the thickness of the original documents, with substantial elimination of disadvantages inherent in the conventional arrangements of this kind.

Another important object of the present invention is to provide an automatic original document feeding arrangement of the above described type which is simple in construction and stable when functioning, and can be readily incorporated into various copying apparatuses and the like at low cost.

In accomplishing these and other objects, according to one preferred embodiment of the present invention, there is provided an automatic original document feeding arrangement for use in a copying apparatus and the like, which includes a sheet feeding section for feeding an original document therefrom, and a transport section provided on an original document placing platen and including a transport belt for transporting the original document so that the transport of the original document is suspended upon detection that a leading edge of the original document has passed through a predetermined position on the platen. The transport belt is composed of a light transmitting material, and a photo-electric sensor having the transport belt and the platen as part of its light path is provided at the predetermined position.

By the arrangement according to the present invention as described above, an improved automatic original document feeding arrangement has been advantageously presented.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
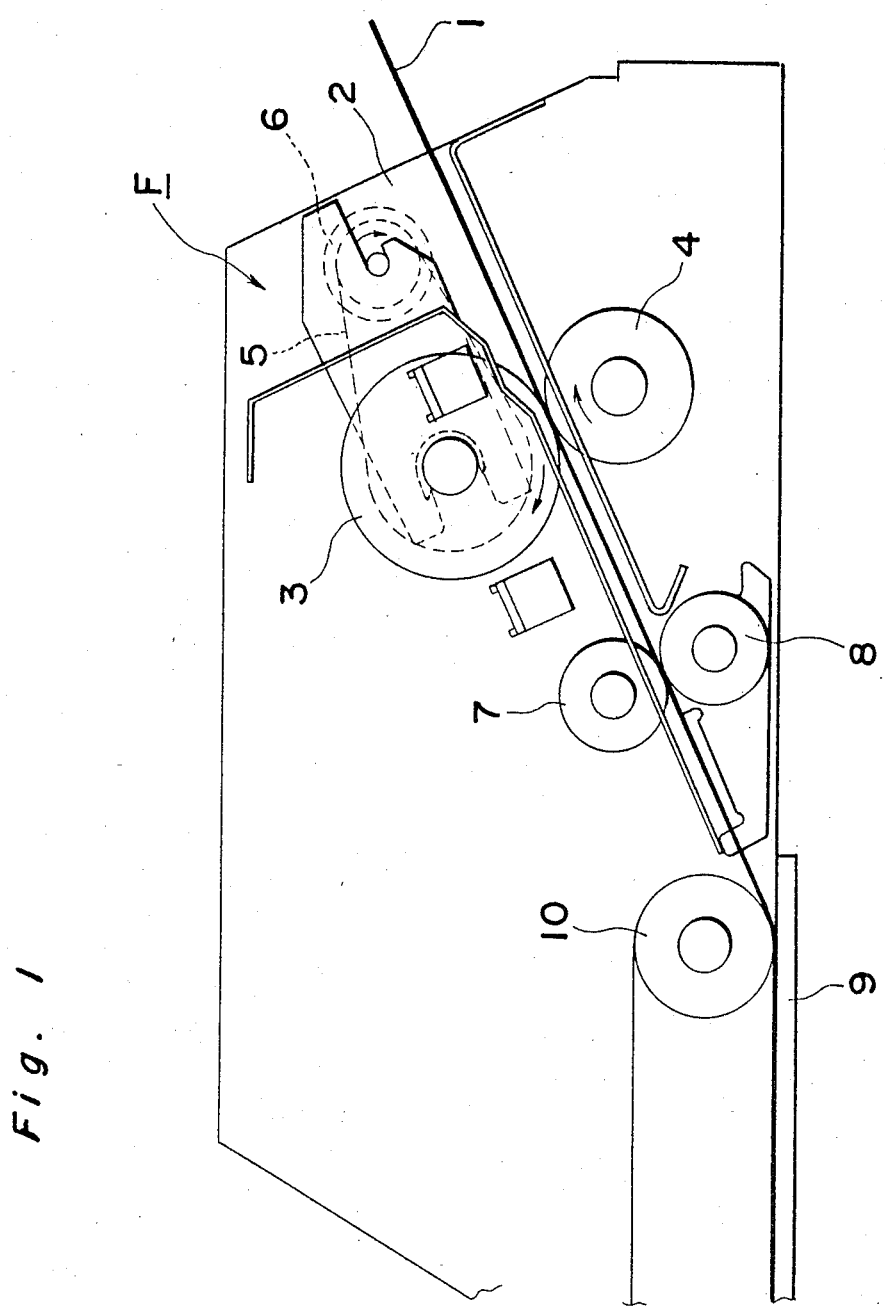
FIG. 1 is a schematic side elevational view showing the construction of a sheet feeding section of an automatic original document automatic feeding arrangement for a copying apparatus according to one preferred embodiment of the present invention.

Before the description of the present invention proceeds, it is to be noted that like parts are designated by like reference numerals throughout the accompanying drawings.

Figure 2:
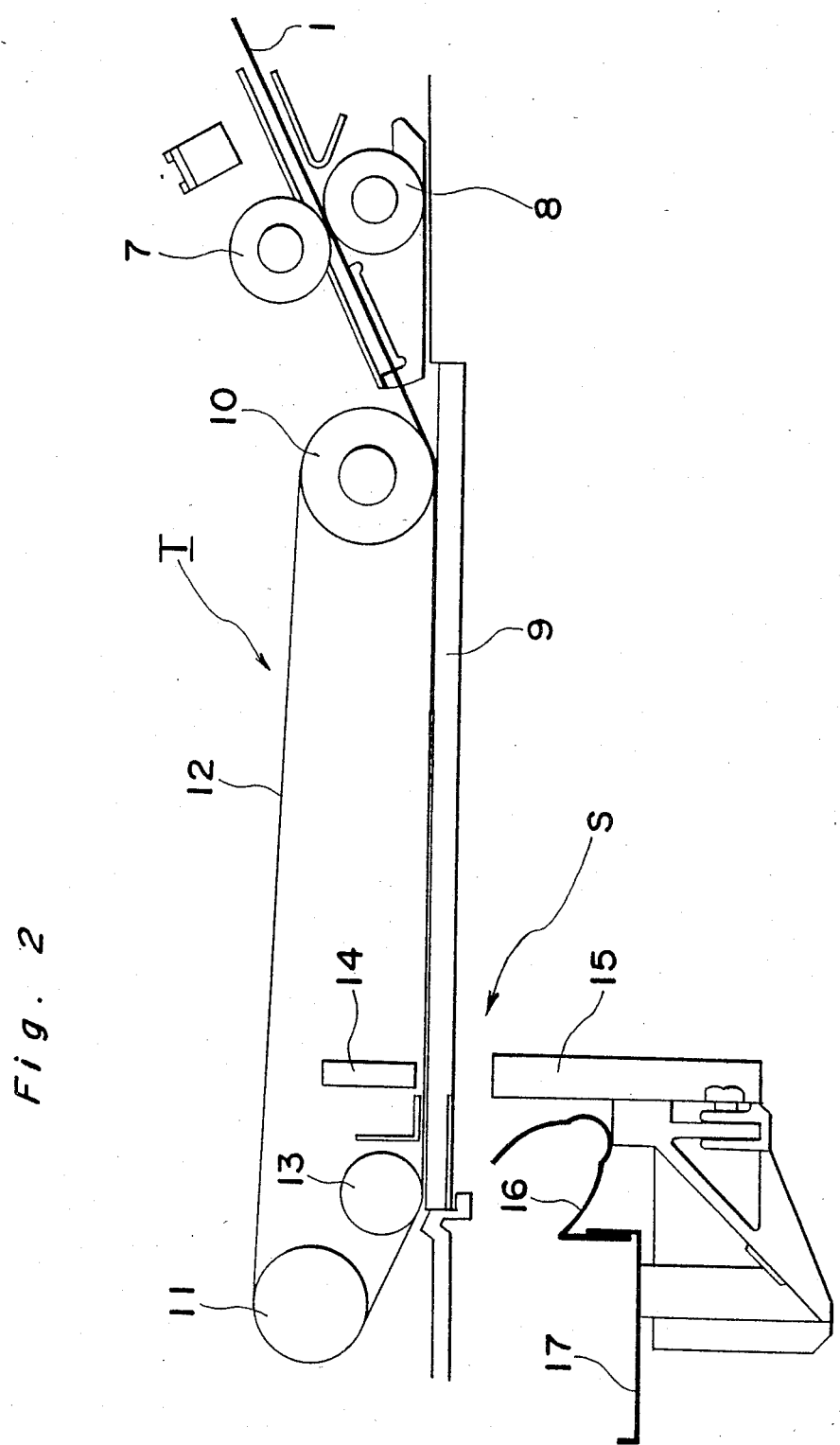
FIG. 2 is a schematic side elevational view showing the construction of a sheet transport section of the automatic original document automatic feeding arrangement of FIG. 1.

Referring now to the drawings, there are respectively shown in FIGS. 1 and 2, construction of a sheet feeding section F and a sheet transport section T of an automatic original document feeding arrangement according to one preferred embodiment of the present invention.

The sheet feeding section F includes a feeding roller 3 disposed to be driven for rotation at a position in the vicinity of an inserting opening 2 for inserting an original document 1 therethrough, another feeding roller 4 rotatably provided to confront the feeding roller 3, and an auxiliary feeding roller 6 connected with the feeding roller 3 through an endless belt 5 so as to obtain the driving force from the roller 3. The feeding roller 3 is adapted to rotate in the clockwise direction. In the original document feeding direction as indicated by an arrow, feeding roller 3 has its coefficient of friction increased, while the feeding roller 4 is arranged to rotate in a direction opposite to that of the feeding roller 3, i.e. in the direction against the original document feeding direction, and is provided with a small coefficient of friction.

In the sheet feeding section F as described above, each of the original documents 1 set on a sheet feeding tray (not shown) is fed through the inserting opening 2 into the mechanism by the auxiliary feeding roller 6, and is perfectly separated, one sheet by one sheet, by the cooperating function of the feeding roller 3 having the large coefficient of friction rotating in the forward direction (i.e. original document advancing direction) and the feeding roller 4 having the small coefficient of friction rotating in the reverse direction (i.e. in the direction opposite to the original document advancing direction), and is further held between a pair of sheet feeding rollers 7 and 8 rotatably disposed subsequent to the rollers 3 and 4 so as to be fed into the sheet transport section T to be described below.

As shown in FIG. 2, the sheet transport section T includes a belt driving roller 10 rotatably provided above the right end portion of an original document placing platform or platen 9, a belt tension roller 11 rotatably disposed in a position above a portion beyond the left side edge of the platen 9, an original document transport belt 12 passed around rollers 10 and 11, and a presser roller 13 provided adjacent to the roller 11 within a loop of the transport belt 12 for pressing the belt 12 against the surface of the platen 9.

The original document transport belt 12 referred to above is formed as an endless belt composed of polyurethane as a base material, which is provided with very superior characteristics in the resistance against abrasion, light transmittance, and elasticity. However, since there is a possibility that a belt made of polyurethane may turn yellow in shade after use over a long period of time, according to the present embodiment, 0.2 to 0.6% of ultraviolet light absorbing agent, 0.1 to 0.6% of ultraviolet light stabilizing agent, 0.5 to 1.0% of anti-oxidizing agent, and 1.0 to 5.0% of titanium oxide are properly blended and mixed into polyurethane for the transport belt 12, whereby a belt white in shade and superior in light transmittance, without turning yellow in color, may be obtained, with the favorable characteristics such as resistance against abrasion, sufficient elasticity, etc. being advantageously maintained.

It is to be noted here that, as materials for constituting the transport belt 12, there may be employed, besides polyurethane, a single polyester, or a belt coated with a whitish rubber having a polyester cloth as a base. By way of example, the transport belt 12 may be constituted by employing a fabric composed of polyester or polyamide group of synthetic fibers as an inner lining, and further applying thereon a coating of vinyl chloride and Pelplen (name used in trade and manufactured by Toyobo Co., Ltd., Japan) copolymer, vinyl chloride and polyurethane copolymer, or chlorosulfonated polyethylene or synthetic rubber, singly or through a proper combination thereof.

The original document transport belt 12 is prepared by utilizing the single sheet endless belt of polyurethane as described above. The roller contact face at the endless belt is mirror-finished, while its contact face with the platen 9 is subjected to an embossing whereby the contact face is processed to form a smooth and extremely fine undulation. By subjecting the roller contact face of the transport belt 12 to the mirror-finishing, the coefficient of friction thereat is increased as compared to the contact face so as to eliminate slippage during driving of the belt 12. Meanwhile, by applying the embossing to the contact face of the belt 12 contacting the platen 9, the coefficient of friction with respect to the platen 9 is decreased due to the establishment of point contacts between surfaces from the undulation. In cooperation with the elastic function of polyurethane itself, it becomes possible to achieve better sliding with respect to a hard glass surface as that which makes up the platen 9, while providing an improved adhesion with respect to a soft original document. In other words, a positive grasping of the original document by the transport belt 12 can be achieved, and moreover, the belt 12 may be smoothly slid with respect to the glass surface.

At a position of the platen 9 where the original document 1 is to be stopped, there is provided a light transmitting type optical fiber sensor S which is one example of a photo-electric sensor including a light emitting portion 14 and a light receiving portion 15. The light emitting portion 14 is disposed close to the original document transport belt 12, while the light receiving portion 15 is provided below and adjacent to the platen 9 in a position confronting the light emitting portion 14. In FIG. 2, the light receiving portion 15 is integrally connected with a light source base plate 17 provided with a main deflector 16.

By the arrangement of FIG. 2, light emitted from the light emitting portion 14 of the optical fiber sensor S is transmitted through the original document transport belt 12 of the light transmitting type and the glass plate of the platen 9 as a light path perpendicular thereto so as to be received by the light receiving portion 15. Therefore, upon operation of the automatic original document feeding arrangement, when the original document 1 is transported over the surface of the platen 9 by the transport belt 12 and the leading edge thereof reaches a position directly below the light emitting portion 14, i.e. a predetermined stopping position for the original document 1, the light emitted from the light emitting portion 14 is intercepted by the leading edge of the original document 1, thus resulting varying in the amount of light received by the light receiving portion 15, consequently actuating a photo-electric switch (not shown) to stop the original document transport belt 12. Accordingly, the original document 1 being transported by the transport belt 12 may be stopped correctly at the predetermined stopping position. Thereafter, upon completion of the exposure necessary for copying, the original document transport belt 12 is again driven so as to advance the original document 1 for discharging. By repeating the functions as described so far, it is possible to quickly and correctly treat a large number of original documents at one time.

It should be noted here that in the foregoing embodiment, although the light emitting portion 14 is disposed above the original document transport belt 12, with the light receiving portion 15 being provided below the platen 9 to confront the light emitting portion 14 so that the transport belt 12 is stopped upon interception of light by the leading edge of the original document, the arrangement may be so modified, for example, that the light emitting portion together with the light receiving portion are provided either above or below the platen, with a reflecting mirror (not shown) being disposed at a position confronting the light emitting portion and spaced from the transport belt and the platen. In the above case, the light emitted from the light emitting portion normally passes through the transport belt 12 and the platen 9 and is reflected by the reflecting mirror, and again passes through the platen 9 and the transport belt 12 so as to be received by the light receiving portion, and in this case, the amount of light received at the light receiving portion is varied as the light is intercepted when the original document passes through the original document stopping position.

As is clear from the foregoing description, according to the present invention, since it is so arranged that the light transmitting material is employed for the original document transport belt so as to detect whether or not the original document has passed through the predetermined position by the photo-electric sensor utilizing the transport belt and the platen as crossing the path of light, the detection may be effected at any desired position in the transport belt without necessity for arranging that part of the original document which protrudes from the original document transport belt, and thus, the construction is remarkably simplified for a stable operation, with a consequent reduction in cost.

Although the present invention has been fully described by way of example with reference to the accompanying drawings, it is to be noted here that various changes and modifications will be apparent to those skilled in the art. Therefore, unless such changes and modifications depart from the spirit and scope of the present invention, they should be construed as included therein.

What is claimed is:

1. An automatic original document feeding arrangement for use in a copying apparatus and the like, the copying apparatus having a sheet feeding section for feeding an original document therefrom, a transport section provided on an original document placing platen, a transport belt for transporting the original document so that the transport of the original document is temporarily suspended upon detecting that a leading edge of the original document has passed through a predetermined position on the platen, wherein the improvement comprises:
    a transport belt composed of a light transmitting material; and
    a photo-electric sensor provided at the predetermined position such that the light received by said sensor passes through both of said light transmitting transport belt and said platen.

2. An automatic original document feeding arrangement as claimed in claim 1, wherein said light transmitting material for said transport belt is composed of polyurethane, a single polyester, or a rubber coating having a polyester cloth as a base material.

3. An automatic document feeding arrangement as claimed in claim 1, wherein said transport belt in the form of a single endless belt having an inner roller contacting surface and an outer platen and document contacting surface is movably supported by a plurality of rollers, said roller contacting surface being mirror-finished.

4. An automatic original document feeding arrangement as claimed in claim 3, wherein said outer platen and document contacting surface is embossed, said embossed surface being mirror-finished and further processed to form smooth and extremely fine undulations, thereby rendering a coefficient of friction less than that of the mirror-finished side of said transport belt.

5. An automatic original document feeding arrangement as claimed in claim 2, wherein said transport belt composed of polyurethane may be treated with an ultraviolet light absorbing agent, an ultraviolet light stabilizing agent, an anti-oxidizing agent, and titanium oxide to prevent discoloration of said transport belt while maintaining its superior characteristics of abrasion resistance, light transmittance, and elasticity.

* * * * *

UNITED STATES PATENT AND TRADEMARK OFFICE
CERTIFICATE OF CORRECTION

PATENT NO. : 4,592,543

DATED : Jun. 3, 1986

INVENTOR(S) : Tanimoto et al.

It is certified that error appears in the above-identified patent and that said Letters Patent is hereby corrected as shown below:

Title page:

In section "[73]", add the following Assignee:

--Sun-S Corporation, Hiroshima-ken, Japan--

Signed and Sealed this

Second Day of December, 1986

Attest:

DONALD J. QUIGG

*Attesting Officer*     *Commissioner of Patents and Trademarks*